(12) United States Patent
Yan et al.

(10) Patent No.: US 11,361,422 B2
(45) Date of Patent: Jun. 14, 2022

(54) AUTOMATIC SCREEN STATE DETECTION ROBOT, METHOD AND COMPUTER-READABLE STORAGE MEDIUM

(71) Applicant: PING AN TECHNOLOGY (SHENZHEN) CO., LTD., Guangdong (CN)

(72) Inventors: Hairui Yan, Guangdong (CN); Bao Zhou, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 263 days.

(21) Appl. No.: 16/632,859

(22) PCT Filed: Oct. 31, 2017

(86) PCT No.: PCT/CN2017/108740
§ 371 (c)(1),
(2) Date: Jan. 21, 2020

(87) PCT Pub. No.: WO2019/041516
PCT Pub. Date: Mar. 7, 2019

(65) Prior Publication Data
US 2020/0167907 A1    May 28, 2020

(30) Foreign Application Priority Data

Aug. 29, 2017    (CN) .......................... 201710754580.7

(51) Int. Cl.
*G05D 1/02*    (2020.01)
*G06K 7/14*    (2006.01)
(Continued)

(52) U.S. Cl.
CPC ........... *G06T 7/0004* (2013.01); *G05D 1/021* (2013.01); *G06K 7/1417* (2013.01); *G06T 5/002* (2013.01);
(Continued)

(58) Field of Classification Search
CPC ...... G05D 1/021; G06K 7/1417; G06T 5/002; G06T 7/0004; G06T 7/90; G06T 2007/30121
See application file for complete search history.

(56) References Cited

U.S. PATENT DOCUMENTS

| | | | | |
|---|---|---|---|---|
| 5,600,574 A | * | 2/1997 | Reitan | ................ H04N 1/00015 |
| | | | | 702/185 |
| 2003/0056486 A1 | * | 3/2003 | Bahlmann | ................ D01H 1/20 |
| | | | | 57/264 |

(Continued)

FOREIGN PATENT DOCUMENTS

| CN | 103838674 A | * | 6/2014 |
|---|---|---|---|
| CN | 106681333 A | * | 5/2017 |

OTHER PUBLICATIONS

Lu et al. ("Mobile robot for power substation inspection—a survey," IEEE/CAA Journal of Automatica Sinica, vol. 4, Issue: 4; Date of Publication: Jan. 25, 2017) (Year: 2017).*

*Primary Examiner* — Yubin Hung

(57) ABSTRACT

The application discloses an automatic screen state detection robot, comprising a memory having an automatic screen state detection program stored thereon and a processor, and the automatic screen state detection program being executed by the processor to implement the operations of: controlling the robot to move into a preset area of each of service devices in a self-service branch respectively; detecting whether a service device has a circuit fault or not if the robot moves into the preset area of the service device; and controlling the service device to display an image according (Continued)

to preset display parameters if the display screen has no circuit fault, and analyzing the image displayed on the display screen to find whether the display screen of the service device has an abnormality of a preset type. The application also provides an automatic screen state detection method and a computer-readable storage medium.

15 Claims, 11 Drawing Sheets

(51) Int. Cl.
    *G06T 5/00*         (2006.01)
    *G06T 7/00*         (2017.01)
    *G06T 7/90*         (2017.01)

(52) U.S. Cl.
    CPC ...... *G06T 7/90* (2017.01); *G06T 2207/30121* (2013.01)

(56) References Cited

U.S. PATENT DOCUMENTS

| | | | |
|---|---|---|---|
| 2007/0046321 A1* | 3/2007 | Kang | G02F 1/1309 324/760.01 |
| 2007/0285578 A1* | 12/2007 | Hirayama | G06T 7/20 348/700 |
| 2009/0322887 A1* | 12/2009 | Kim | H04N 17/04 348/189 |
| 2014/0118392 A1* | 5/2014 | Tran | H04N 21/4532 345/619 |
| 2016/0112702 A1* | 4/2016 | Qian | H04N 17/004 348/177 |
| 2016/0264262 A1* | 9/2016 | Colin | G01N 29/04 |
| 2017/0094268 A1* | 3/2017 | Gulati | B60K 35/00 |

\* cited by examiner

Calculated boundary of small-sized rectangle    Calculated boundary of medium-sized rectangle Display area of screen calculated on the basis of medium-sized rectangle and small-sized rectangle

```
┌─────────────────────────────────────────────────────────────┐
│ Control the display screen of the service device to be     │
│ detected to display a plurality of preset colors in a      │── S301
│ single-color display mode respectively, wherein different   │
│ preset colors correspond to display areas of different     │
│ sizes, a shape of the display area corresponding to each   │
│ preset color corresponds to a shape of a maximum display   │
│ area of the display screen, and a display area             │
│ corresponding to one of the preset colors is the maximum   │
│ display area of the display screen                          │
└─────────────────────────────────────────────────────────────┘
                            │
                            ▼
┌─────────────────────────────────────────────────────────────┐
│ Take a mask code for a display graph on the display screen │── S302
│ corresponding to a preset color when the preset color is   │
│ displayed in the single-color display mode, so as to       │
│ obtain a mask code image                                    │
└─────────────────────────────────────────────────────────────┘
                            │
                            ▼
┌─────────────────────────────────────────────────────────────┐
│ Carry out anti-interference treatment on a mask code image │── S303
│ of a preset color corresponding to a display area of a     │
│ smaller size to obtain an anti-interference image,         │
│ wherein the display area of the smaller size is a display  │
│ area of a size other than the maximum display area         │
└─────────────────────────────────────────────────────────────┘
                            │
                            ▼
┌─────────────────────────────────────────────────────────────┐
│ Determine the maximum display area of the display screen   │── S304
│ according to the obtained anti-interference image, extract │
│ an image of an actual display area for the mask code       │
│ image of the preset color corresponding to the maximum     │
│ display area according to the determined maximum display   │
│ area, so as to obtain a maximum display image              │
└─────────────────────────────────────────────────────────────┘
                            │
                            ▼
┌─────────────────────────────────────────────────────────────┐
│ Carry out noise-filtering enhancement pretreatment on the  │── S305
│ maximum display image to obtain an enhanced image          │
└─────────────────────────────────────────────────────────────┘
                            │
                            ▼
┌─────────────────────────────────────────────────────────────┐
│ Analyze the enhanced image to find whether the display     │── S306
│ screen of the service device to be detected has the        │
│ abnormality of the preset type                              │
└─────────────────────────────────────────────────────────────┘
```

FIG. 17

AUTOMATIC SCREEN STATE DETECTION ROBOT, METHOD AND COMPUTER-READABLE STORAGE MEDIUM

CLAIM OF PRIORITY

This application claims priority under the Paris Convention to Chinese Patent Application No. 201710754580.7, entitled "Automatic Screen State Detection Robot, Method and Computer-readable Storage Medium", filed on Aug. 29, 2017, which is incorporated herein by reference in its entirety.

FIELD OF THE INVENTION

The application relates to the technical field of terminals, in particular to an automatic screen state detection robot, method and computer-readable storage medium.

BACKGROUND OF THE INVENTION

Until recently, in the fields of finance, insurance and the like, more self-service branches (such as a self-service bank branch) have been deployed to facilitate services and reduce the labor cost. The self-service branches are areas designed for self-service of banking, insurance and the like and can be accessed in stores at multiple locations. Devices for various self-services, such as a cash recycling machine, an ATM, a self-service payment machine, a PC prepared for a client (for example, a PC specially used for a VIP client, providing information inquiry about financial management, funds, stock and the like), a self-service inquiry device, an order scheduling machine, an advertisement device and the like can be found in the stores and are generally equipped with terminal screens. The terminal screen is a fragile electronic device which is prone to problems in display, and in turn causes troubles to users. Therefore, regular check and maintenance of the state of the screen of the service device in a self-service branch are necessary.

At present, the solutions for checking the state of the screen of the service device generally include: solution 1, giving feedback through manual inspection, and solution 2, giving feedback through customer complaints.

However, solution 1 is labor-consuming and poor in time-effectiveness, with some details not necessarily and carefully inspected, for example, small cracks may be missed by the manual inspection, leading to likely mistakes and omissions. Solution 2 has the defect of adverse influence on user experience, and many users do not necessarily give feedback, even if they do, their feedback may not be comprehensive and objective in general, resulting still in poor time-effectiveness and mistakes as well omissions. Therefore, it has become a technical urgency to automatically and accurately detect the state of the screen of the service device in a self-service branch.

SUMMARY OF THE INVENTION

It's a major object of the application to automatically detect the state of a screen of a service device in a self-service branch by providing an automatic screen state detection robot, method and computer-readable storage medium.

In order to achieve the above object, the application provides an automatic screen state detection robot, comprising a memory having an automatic screen state detection program stored thereon and a processor, and the automatic screen state detection program being executed by the processor to implement the operations of:

controlling the robot to move into a preset area of each of service devices in a self-service branch respectively;

taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if the display screen has no circuit fault, and analyzing the image displayed on the display screen to find whether the display screen of the service device to be detected has an abnormality of a preset type.

In addition, in order to achieve the above object, the application also provides an automatic screen state detection method, comprising:

controlling the robot to move into a preset area of each of service devices in a self-service branch respectively;

taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if the display screen has no circuit fault, and analyzing the image displayed on the display screen to find whether the display screen of the service device to be detected has an abnormality of a preset type.

In addition, in order to achieve the above object, the application also provides a computer-readable storage medium, the computer-readable storage medium has an automatic screen state detection program stored thereon, and the automatic screen state detection program can be executed by one or more processors to implement the steps of:

controlling the robot to move into a preset area of each of service devices in a self-service branch respectively;

taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if the display screen has no circuit fault, and analyzing the image displayed on the display screen to find whether the display screen of the service device to be detected has an abnormality of a preset type.

According to the automatic screen state detection robot, method and computer-readable storage medium provided by the application, the technical solution includes: controlling the robot to move into a preset area of each of service devices in a self-service branch respectively; taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if there is no circuit fault, and analyzing the image displayed on the display screen according to preset analysis rules to find whether the display screen of the service device to be detected has an abnormality of a preset type. The solution requires no manual participation, and the circuit fault and the screen display state of the device are automatically detected by moving the robot into a corresponding area.

BRIEF DESCRIPTION OF THE DRAWINGS

FIG. 17 is a flowchart of a second embodiment of the automatic screen state detection method of the present application.

The achievement of the object, functional features and advantages of the present application will be further described with reference to the embodiments in combination with the accompanying drawings.

DETAILED DESCRIPTION OF THE INVENTION

It should be understood that the embodiments described herein are merely illustrative of the present application and are not intended to be limiting thereof.

Figure 1:
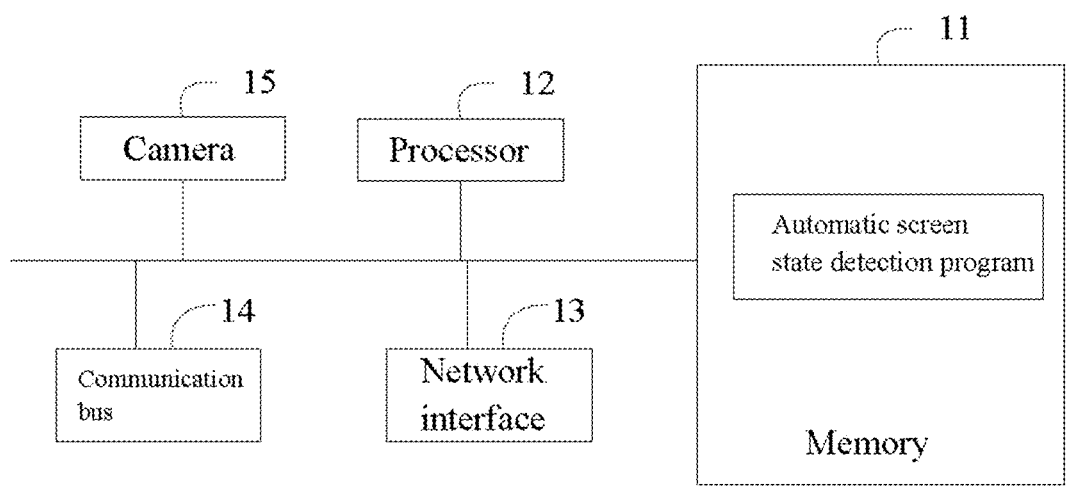
FIG. 1 is a schematic view of a preferred embodiment of the automatic screen state detection robot of the present application.
Figures 2A, 2B:
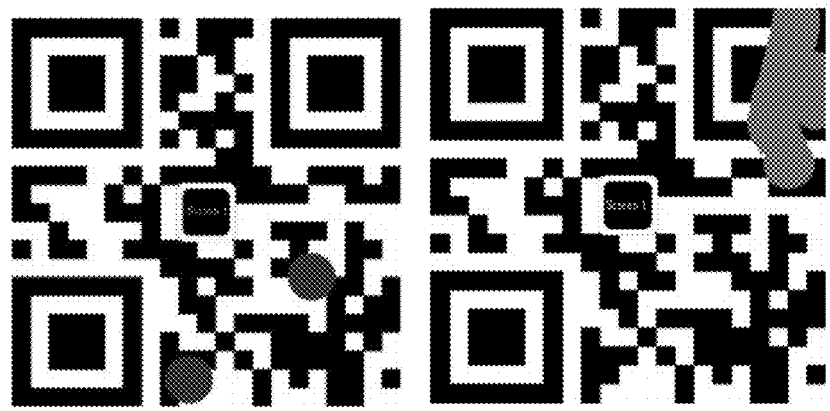
FIGS. 2a to 2d are two-dimensional codes in which part of information is blocked.
Figures 2C, 2D:
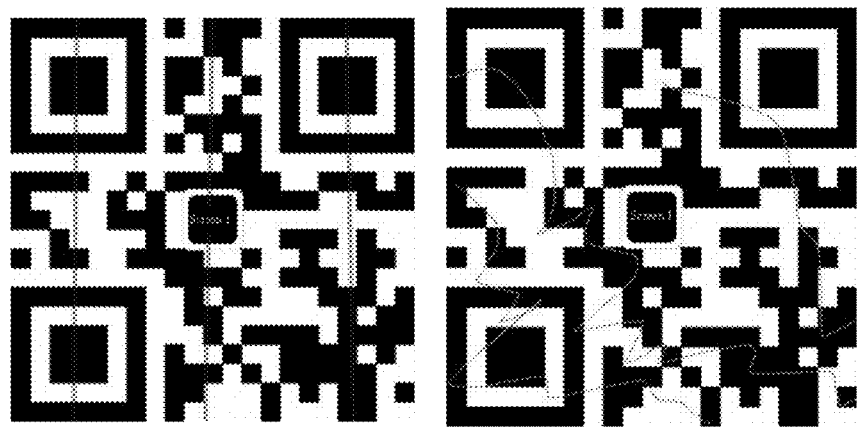

The application provides an automatic screen state detection robot. With reference to FIG. 1, a schematic view of a preferred embodiment of the automatic screen state detection robot of the present application is shown.

In the present embodiment, the automatic screen state detection robot includes a memory 11, a processor 12, a communication bus 13, a network interface 14, and a camera 15.

The memory 11 includes at least one type of readable storage medium including a flash memory, a hard disk, a multimedia card, a card-type memory (e.g., SD or DX memory, etc.), a magnetic memory, a magnetic disk, an optical disk, etc. The memory 11 may in some embodiments be an internal storage unit of the automatic screen state detection robot, for example a hard disk of the automatic screen state detection robot. The memory 11 may also be an external storage device of the automatic screen state detection robot in other embodiments, such as a plug-in hard disk equipped on the automatic screen state detection robot, a Smart Media Card (SMC), a Secure Digital (SD) card, a Flash Card, etc. Further, the memory 11 may also include both an internal storage unit and an external storage device of the automatic screen state detection robot. The memory 11 can be used not only for storing application software installed in the automatic screen state detection robot and various types of data, such as codes of the automatic screen state detection program, etc., but also for temporarily storing data that has been output or is to be output.

The processor 12 may in some embodiments be a central processing unit (CPU), a controller, a microcontroller, a microprocessor or other data processing chip for running program code or processing data stored in the memory 11, such as executing an automatic screen status detection program or the like.

A communication bus 13 is used for connection communication between these components.

The network interface 14 may alternatively include a standard wired interface, a wireless interface (such as a WI-FI interface), typically used to establish a communication connection between the robot and other electronic devices. In this embodiment, the robot may be connected to a user terminal via the network interface 14 to receive the detection instructions sent by the user terminal, or may be connected to the service device via the network interface 14 to control the service device to display images according to preset display parameters.

The camera 15 is used for collecting the display content of the display screen of the service device.

FIG. 1 shows only an automatic screen status detection robot with components 11-15 and an automatic screen status detection program, but it is to be understood that not all illustrated components need to be implemented and that more or fewer components may alternatively be implemented.

Alternatively, the robot may further include a user interface, which may include a display, an input unit such as a Keyboard, physical keys for triggering detection instructions, etc., and may further include a standard wired interface and a wireless interface. Alternatively, in some embodiments, the display may be an LED display, a liquid crystal display, a touch-sensitive liquid crystal display, an OLED (Organic Light-Emitting Diode) touch, etc. The display may also be referred to as a display screen or display unit.

Alternatively, the robot may also include Radio Frequency (RF) circuitry, sensors, WiFi modules, etc. The sensor may be a light sensor, a distance sensor, etc.

In the embodiment shown in FIG. 1, an automatic screen state detection program is stored in the memory 11; the processor 12 executes the program to implement the following operations:

S1, the robot is controlled to move into a preset area of each of service devices in a self-service branch respectively;

The robot provided by the embodiment can be deployed in a self-service branch, and there can be one or more service devices in the self-service branch. The robot can be controlled to move to a self-service branch at any time or regularly and when the robot is standby or receives a detection instruction, to start the detection of the display state of a screen of a service device in the self-service branch. The robot is determined to be standby when no service of the robot has been called for a preset duration.

Each of the service devices in the self-service branch is assigned with a preset area, the preset area of one service device refers to an area around the service machine having a radius equal to or less than a preset distance. The position coordinate of the robot in the self-service branch is determined by positioning itself in its moving process and is combined with the known position coordinate of the service device in the self-service branch to calculate distances between the current position and the preset positions where service devices are located, and if the a between the current position and the position where one service device is located is less than or equal to the preset distance, it's determined that the robot has moved into the preset area of the service device.

When a plurality of service devices are deployed in a self-service branch, they need to be detected one by one. There are a variety of ways to control the robot to move into the predetermined area of each of the service devices in the self-service branch respectively, two of which are given below as examples.

In one embodiment, the robot is controlled to move by following a preset mobile navigation path, and after the robot moves into the preset area of one service device and detection of the display screen of the service device to be detected is completed, the robot is controlled to continue moving by following the mobile navigation path to another undetected service device until detection of the display screens of all the service devices is completed.

Alternatively, in another embodiment, the robot is controlled to move randomly, and after the robot moves into the preset area of one service device and detection of the display screen of the service device to be detected is completed, the service device to be detected is labeled as an obstacle and the robot is controlled to circumvent; after the circumvention is completed, the robot is controlled to continue moving randomly to another service device until all the service devices are labeled as the obstacles; and the obstacle labels of the service devices are removed.

In particular, in the random moving process of the robot, the mechanism of the circumvention algorithm is as follows: when detection of a service device is completed by the robot, the robot shifts leftwards or rightwards relative to the current moving direction by a preset angle and determines whether it can circumvent successfully or not after shifting by the angle. If the robot can circumvent successfully after shifting by the angle, it continues to move randomly along the shifted direction, and if the robot is obstructed still after shifting by the angle, it continues to shift relative to the same direction by the preset angle until it circumvents successfully; the circumvention is conducted through the algorithm of continuously adjusting the shift angle.

S2, a service device corresponding to a preset area is taken as the service device to be detected if the robot moves into the preset area, and a preset graphic code is sent to the service device to be detected so as to determine whether the service device to be detected has a circuit fault or not according to content of the preset graphic code displayed on a display screen.

When the robot enters a preset area, the service device corresponding to the preset area is taken as the service device to be detected, and the service device corresponding to the preset area is detected. The robot can adjust the angle of the camera 15 until a currently displayed image on the display screen of the service device can be photographed, and then the preset graphic code is sent to the service device to be detected so as to determine whether the service device to be detected has a circuit fault or not according to the content of the preset graphic code displayed on the display screen. In particular, the robot is controlled to communicate wirelessly with the service device to be detected (i.e., the service device corresponding to the current preset area) so as to send a display instruction for displaying the preset graphic code containing preset information to the service device to be detected, and the preset graphic code is displayed by the service device according to the received display instruction; the robot is controlled to scan and analyze the content displayed on the display screen of the service device to be detected; if the preset information is scanned and analyzed from the display screen of the service device to be detected, it is determined that the display screen of the service device to be detected has no circuit fault; and if the preset information is not scanned and analyzed from the display screen of the service device to be detected, it is determined that the display screen of the service device to be detected has the circuit fault.

In some embodiments, the preset graphic code may be a two-dimensional code with preset information. Detection of circuit faults by using two-dimensional codes has the following advantages: the two-dimensional code has good fault tolerance and error correction capability, and as shown in FIGS. 2a to 2d, the two-dimensional code can still be identified even if part of the information is blocked due to interference such as stains, blobs, cracks and the like on the display screen, so that the determination of whether a circuit fault occurs or not may not be influenced regardless all of those; the two-dimensional code can contain information such as the ID of the screen, that is to say, even when the robot is simultaneously confronted with the display screens of a plurality of service devices, the service device corresponding to the preset area can be identified according to the screen ID contained in the two-dimensional codes. Since the outer contour of the two-dimensional code is square, identification can be done without requiring the robot to be right in front of the target screen, even in a perspective view, the robot can easily restore the deformation caused by the perspective view, as shown in FIGS. 3a to 3c.

Figure 3A:
FIG. 3a is a two-dimensional code under a perspective view.
Figure 3B:
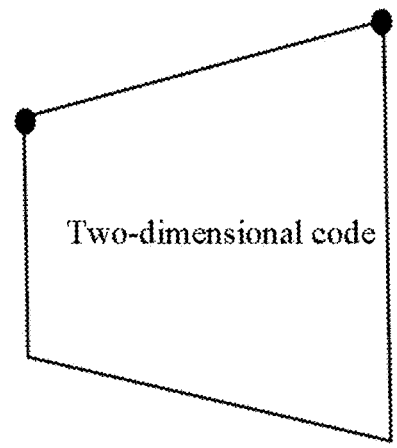
FIG. 3b is an outer contour model of the two-dimensional code under the perspective view.
Figure 3C:
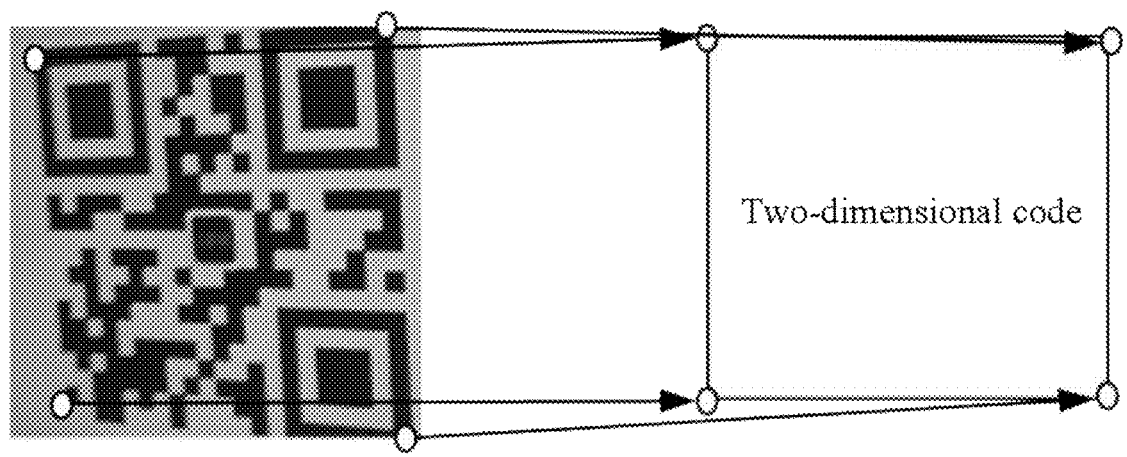
FIG. 3c shows the effect of inverse perspective of the two-dimensional code under the perspective view.

As can be seen from FIGS. 3a and 3b, when the robot processes the content displayed on the screen with the camera, the outer contour of the two-dimensional code may be non-rectangular in the lens of the robot due to the perspective view caused by the position of the robot to some extent. It can be seen from FIG. 3b that the two-dimensional code is not shown as a square, but a quadrilateral shape, resulting in "foreshortening effects". However, the robot can perform inverse perspective transformation under the perspective view so that the two-dimensional code can be identified normally, and the inverse perspective transformation method, which is a proven prior art, is not explained in detail herein. With reference to FIG. 3c, shown is the effect of the two-dimensional code after inverse perspective transformation.

Further, in some embodiments, prompt message is sent to a predetermined monitoring device to indicate that the display screen has the circuit fault to be dealt with if the service device to be detected has the circuit fault. For example, a prompt message including a unique identification (ID) of the service device having the circuit fault and a branch identification of the self-service branch where the service device to be detected is located is sent to a background server, and for example, the prompt message format can be "the display screen of the service device with the ID number ** in the self-service branch with the branch identification number *** has the circuit fault to be dealt with".

S3, the service device to be detected is controlled to display an image according to preset display parameters if the display screen has no circuit fault, and the image displayed on the display screen is analyzed to find whether the display screen of the service device to be detected has an abnormality of a preset type.

S3 includes specifically the following steps:

S31, the display screen of the service device to be detected is controlled to display a plurality of preset colors, for example, three preset colors red, green and blue, in a single-color display mode respectively, wherein different preset colors correspond to display areas of different sizes, a shape of the display area corresponding to each preset color corresponds to a shape of a maximum display area of the display screen, and a display area corresponding to one of the preset colors is the maximum display area of the display screen;

S32, a mask code for a display graph on the display screen corresponding to a preset color is taken when the preset color is displayed in the single-color display mode, namely other colors except the preset color of the display screen are blocked, so as to obtain a mask code image;

S33, anti-interference treatment is carried out on a mask code image of a preset color corresponding to a display area of a smaller size to obtain an anti-interference image, wherein the display area of the smaller size is a display area of a size other than the maximum display area;

S34, the maximum display area of the display screen is determined according to the obtained anti-interference image, an image of an actual display area for the mask code image of the preset color corresponding to the maximum display area is extracted according to the determined maximum display area, so as to obtain a maximum display image; because if an interference area exists in the peripheral range of the screen, for example, "inflow of water" occurs around the screen, the screen cannot normally display at its boundary area, then the maximum image obtained after obtaining the mask code is still incomplete; this step in essence excludes the boundary interference from detection, and therefore the maximum display area should be obtained in the above-mentioned manner.

Figure 4:
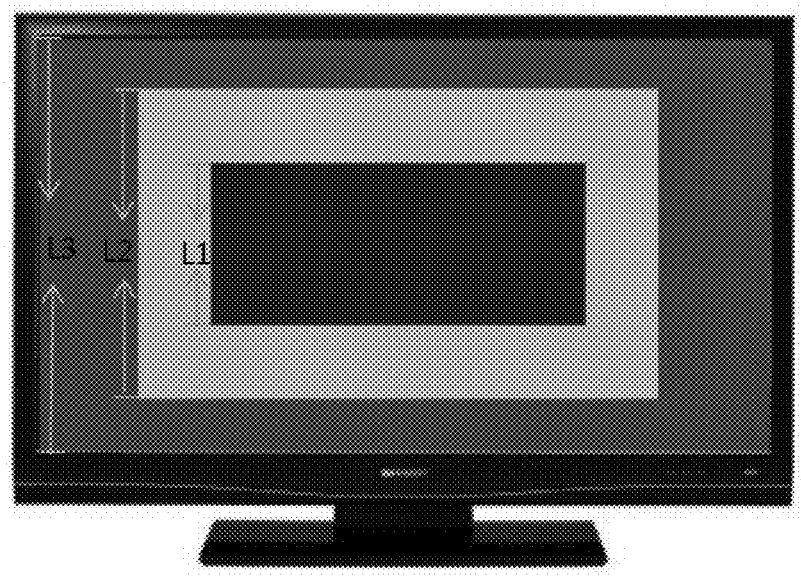
FIG. 4 is a schematic view of display areas of different sizes provided on a display screen.

With reference to FIG. 4, as an example, three different sized display areas are provided on the display screen, wherein width of the small-sized rectangle screen is L1, width of the medium-sized rectangle screen is L2, and width of the large-sized rectangle screen is L3. When the robot controls the screen display, the proportional relation of L1, L2 and L3 can be set as: $L3=\theta_1 L2=\theta_2 L1$, i.e., $\theta_1$ and $\theta_2$ are known. In addition, the proportional relation $\zeta$ between the length and width of the screen is also known. After the value of L1 or L2 is obtained according to the displayed content, the width L3 of the display screen can be calculated according to the proportional relation of L1, L2 and L3, and then the length W of the display screen can be calculated according to the length-width proportional relation $L/W=\zeta$.

In particular, the mechanism of the step of determining the maximum display area of the display screen according to the obtained anti-interference image of the preset color corresponding to the display area of the smaller size, extracting an image of an actual display area for the mask code image of the preset color corresponding to the maximum display area according to the determined maximum display area, so as to obtain a maximum display image is as follows:

The width of the large-sized rectangular can be calculated on the basis of the width $L_1$ of the small-sized rectangular area according to $L3=\theta_1 L2=\theta_2 L1$, and is represented by $L'_3$. Likewise, the width of the large-sized rectangular can also be calculated on the basis of the width $L_2$ of the medium-sized rectangle, and is represented by $L''_3$. In order to reduce errors, in the present application, it is preferable to take the average of these two values as the width of the large-sized rectangle according to Equation 1:

$$L_3 = \frac{L'_3 + L''_3}{2}, \qquad \text{Equation 1}$$

Figure 6:
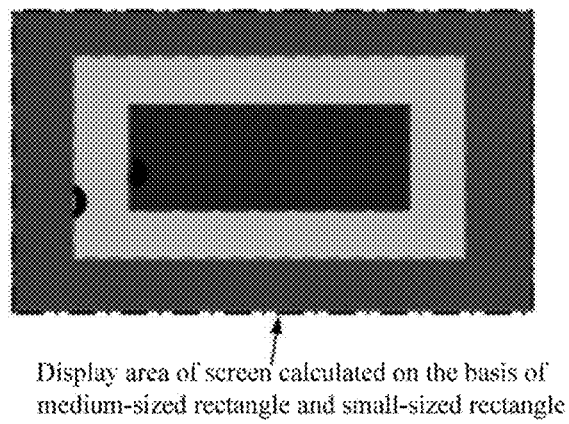
FIG. 6 shows an outline curve of a large-sized rectangular area.

And then the length W of the large-sized rectangle is calculated according to the length-width proportional relation $L/W=\zeta$. Thus, it is possible to obtain the area of the large-sized rectangle, which is the maximum display area of the screen, that is, the outer contour curve of the maximum-sized rectangular area as shown in FIG. 6.

However, after the mask code images of different colors are taken respectively, since the screen boundary itself may be interfered by other colors, for example, the screen boundary itself may have blobs, and the images for which mask codes are taken according to different colors may not be complete yet. To address this problem, the application adopts a solution of:

obtaining coordinates of a plurality of points on each of boundary lines of the mask code image of the preset color corresponding to the display area of the smaller size;

obtaining an extension line of each of the boundary lines of the mask code image through a least-square straight-line fitting algorithm on the basis of the coordinates of the plurality of points on each of the boundary lines;

obtaining intersection points of the four boundary lines according to the extension line of each of the boundary lines of the mask code image, and determining a position of a quadrilateral of the mask code image according to the intersection points of the four boundary lines and the four boundary lines, namely, the scope framed by the small-sized or medium-sized rectangles; and transforming the quadrilateral into a rectangle through inverse perspective transformation, and obtaining the anti-interference image according to a position of the mask code image rectangle.

Figure 5:
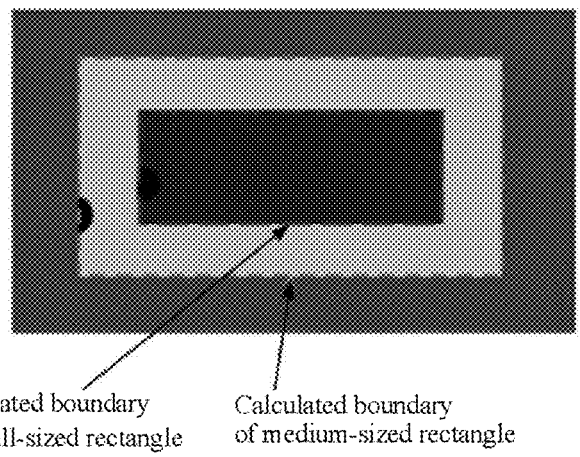
FIG. 5 shows boundaries of a small-sized rectangular area and a medium-sized rectangular display area.
Figure 7:
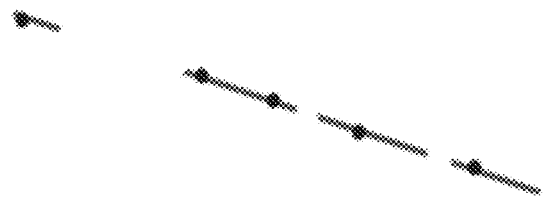
FIG. 7 is a schematic view of a plurality of points taken from a rectangular boundary.
Figure 8:
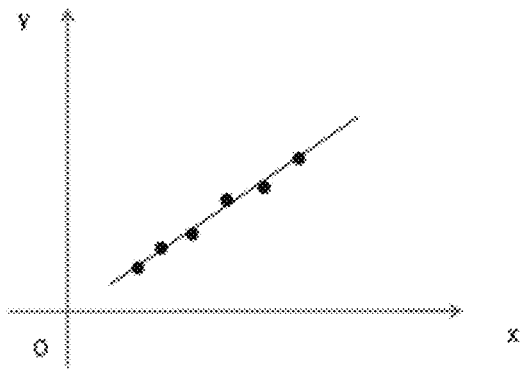
FIG. 8 is a schematic view of a straight line obtained for the taken points through a least-square straight-line fitting algorithm.

With reference to FIG. 5, a boundary of the calculated small-sized rectangle and a boundary of the medium-sized rectangle are shown respectively. With reference to FIG. 7, several points are taken from the boundary, and the boundary is simulated through a least-square straight-line fitting algorithm, as shown in FIG. 8. The least-square straight-line fitting algorithm is presented as $y_{calculation}=a0+a1*x$, wherein $y_{calculation}$ is the simulated straight line, $a_0$ and $a_1$ are parameters to be solved. After $a_0$ and $a_0$ are obtained through the algorithm, the extension line of the boundary line can be obtained, and extension lines of the four boundary lines are respectively obtained the same, after this the intersection points of the four boundary lines are determined, the position of the quadrilateral of the mask code image is determined according to the intersection points of the four boundary lines and the four boundary lines, namely, the scope framed by the small-sized or medium-sized rectangles, and then accurate values of L1 and L2 are determined.

S35, noise-filtering enhancement pretreatment is carried out on the maximum display image to obtain an enhanced image.

Figure 9:
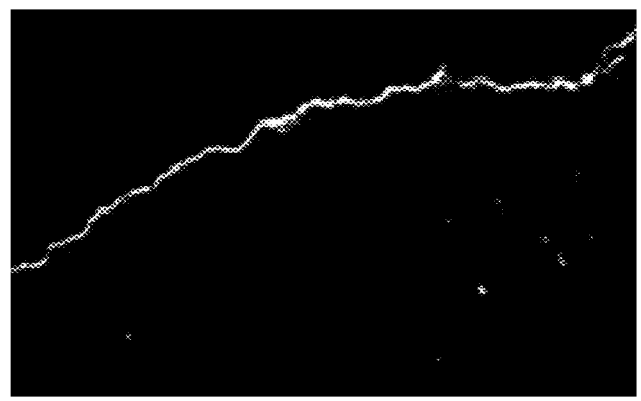
FIG. 9 shows a screen state before noise-filtering enhancement pretreatment.
Figure 10:
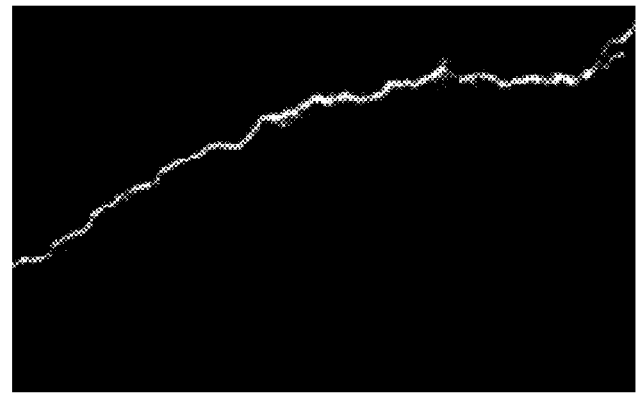
FIG. 10 shows a screen state after noise-filtering enhancement pretreatment.

The mechanism of carrying out noise-filtering enhancement pretreatment on the maximum display image to obtain an enhanced image is explained as follows: the collected abnormal image of the screen can be influenced by non-uniform illumination, irregular gaps on the surface of the screen, factors of the device and the like, as a result, the collected images have noise which needs to be eliminated, and meanwhile, it's required to keep the details of the abnormal state of the screen and improve the contrast of cracks against the background as much as possible to facilitate subsequent segmentation and identification. As can be seen from the graph before the pretreatment of FIG. 9 and the graph after the pretreatment of FIG. 10, the noise interference is less in the graph with enhanced noise filtering, and the abnormality is more clearly visible.

The image is pretreated by the method of guided filter. The algorithm steps of using the guided filter are as follows: a grayed screen image is used as an input image P, a grayed screen image is also used as a guide image I, an image filtered by using a noise filter is q, and the input image P is enhanced by using Equation 2.

$$P\_enhanced=(I-q)m+q, \qquad \text{Equation 2}$$

Wherein m is an enhancement coefficient which depends on specific circumstance, and the filter can be selected according to specific circumstance, herein a guided filter is selected to filter the image P.

The parameter m here can be re-adjusted through feedback according to P_enhanced effect (enhanced image P). An iterative solution is conceived herein, which is mainly implemented by providing feedback concerning the P_enhanced effect and giving a higher weight to the more satisfying P_enhanced effect, otherwise a lower weight to the less satisfying P_enhanced effect.

In the following equation, $\varepsilon$ is a ratio of satisfaction, the enhanced satisfaction is evaluated according to the effect of the P_enhanced image, and the highest enhanced satisfaction is set to be a fixed value, for example, 500.

$$\varepsilon = \frac{\text{enhanced satisfaction}}{\text{highest enhanced satisfaction}}, \qquad \text{Equation 3}$$

According to the application, in order to better adjust the satisfaction value, c value is subjected to an alpha operation defined as follows:

$$\alpha = \frac{1}{2}\ln\left(\frac{1-\varepsilon}{\varepsilon}\right), \qquad \text{Equation 4}$$

The $n^{th}$ iteration is represented by $T_n$, the $(n+1)^{th}$ iteration is represented by $T_{n+1}$, and after the $n^{th}$ iteration, the value of m is $m_{T_n}$, and then:

$$m_{T_n}=m_{T_{n-1}}e^{-\alpha}, \qquad \text{Equation 5}$$

The iterative process is as follows: first, an initial weight value m is given as $m_{T_1}$ which is then substituted into Equation 2 to calculate the P_enhanced image, the satisfaction on the effect of the P_enhanced image is evaluated according to Equation 3, the satisfaction ratio $\varepsilon$ obtained is subjected to the alpha operation, and then the m weight value is updated by using the alpha operation result and Equation 5. The steps above are repeatedly carried out in sequence to update m, and an optimal weight value m is obtained after several iterations. Because the weight value m is modified after each iteration, the $\varepsilon$ value is reduced when the image P_enhanced effect is poor, so that the final weight value m is reduced, and otherwise, the weight value is increased accordingly. Each adjustment will bring a better image P_enhanced effect, the number of iterations is set to be a fixed value (herein set to be 10), and after n iterations, a convergence will occur, where, namely, the image P_enhanced effect is approaching the optimum state. And the enhanced image P_enhanced is taken as an input image P and the grayed screen image is taken as a guide image I to obtain a filtered image which is a final enhanced and smoothed image.

S36, the enhanced image is analyzed to find whether the display screen of the service device to be detected has the abnormality of the preset type which includes blobs, lines and cracks.

Blob detection analysis is carried out on the enhanced image to determine whether the display screen of the service device to be detected has blobs.

Figure 11:
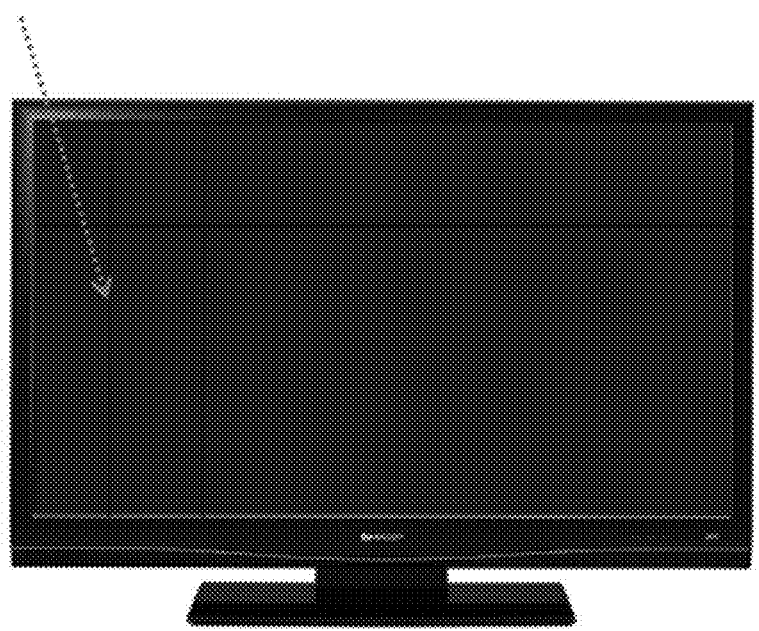
FIG. 11 is a schematic view showing a state where lines appear on the display screen.

With reference to FIG. 11, a case where lines appear on the screen is shown.

In one embodiment, the process of identifying the lines is as follows: an image pretreated by the above steps is obtained, a straight line is detected by using Hough Transform, lines are determined to exist when the number of the detected lines is more than 1, and otherwise, no line exists.

Hough Transform is a feature extraction technique. Classical Hough Transform can identify straight lines in an image, and evolves to identify any shapes, but more commonly, to identify circles and ellipses, and herein, Hough Transform is used for identifying the state of the lines on the screen.

In a system of rectangular coordinates, a straight line is defined as:

$$y=mx+b, \qquad \text{Equation 6}$$

Wherein, m is the slope and b is the Y-intercept, a straight line can be uniquely determined as long as m and b are determined. If an algebraic distance from the origin to the straight line is represented by $\rho_0$, the included angle between the orthogonal line with respect to the straight line and the x-axis is represented by $\theta_0$, then:

$$m = -\frac{1}{\tan\theta_0}, \qquad \text{Equation 7}$$

$$b = \frac{\rho_0}{\sin\theta_0}, \qquad \text{Equation 8}$$

Then the straight line can also be represented as:

$$y = \left(-\frac{\cos\theta_0}{\sin\theta_0}\right)x + \left(\frac{\rho_0}{\sin\theta_0}\right), \qquad \text{Equation 9}$$

The above equation can be written in a more general form as:

$$\rho = x\cos\theta + y\sin\theta, \qquad \text{Equation 10}$$

It will be readily appreciated that (ρ, θ) represents the polar coordinates. But if (ρ, θ) is also represented in the form of rectangular coordinates, i.e., ρ and θ are subjected to an orthogonal treatment, then (ρ, θ) is called Hough space.

A point in the system of rectangular coordinates corresponds to a sinusoid in the Hough space. A straight line is composed of countless points, and corresponds to countless sinusoids in the Hough space, but the sinusoids intersect at a point (ρ₀, θ₀), which is substituted into Equations 7 and 8 to solve the slope and intercept of the straight line, so that a straight line is determined. Therefore, when a line is identified using Hough Transform, a local maximum value in Hough space may correspond to a straight line.

The lines are detected by manual observation conventionally, but according to the method of this embodiment, the pretreated image is automatically detected by a robot to find whether there are lines by the above means.

Figure 12:
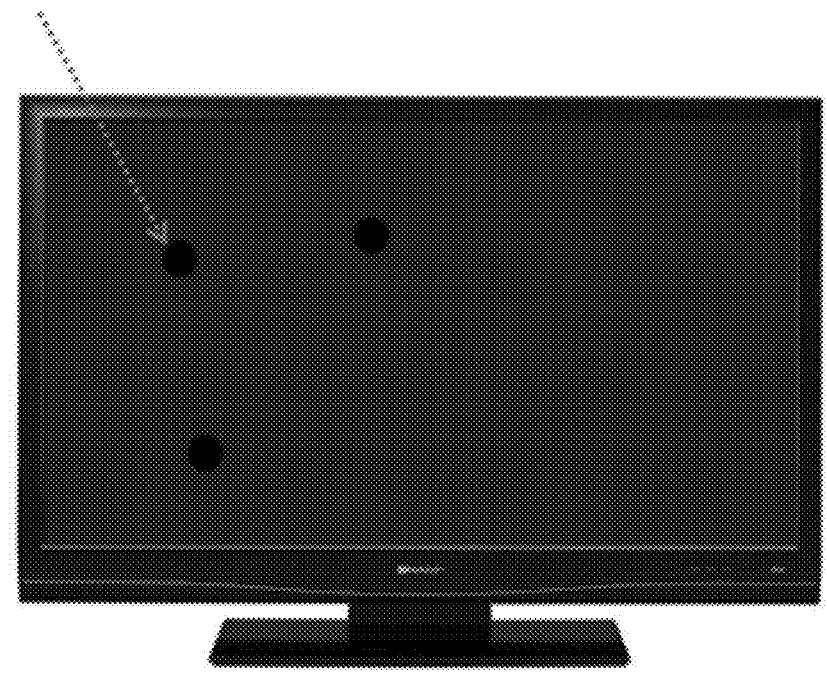
FIG. 12 is a schematic view showing a state where blobs appear on the display screen.

Line detection analysis is carried out on the enhanced image to determine whether the display screen of the service device to be detected has lines. With reference to FIG. 12, a case where blobs appear on the screen is shown.

In one embodiment, the process of identifying the blobs is as follows: a pretreated picture is obtained for detection of blobs by using a SimpleBlobDetector (blob detection operator) algorithm, it is determined that there are blobs on the screen when the number of the detected blobs is more than 1, and otherwise it is determined that no blob exists.

In addition, in order to simplify the setting of parameters such as an area, a binarization threshold value and the like for identifying blobs, a method is also introduced for selecting parameters used in the SimpleBlobDetector algorithm in the embodiment.

Some pictures with blobs on the screen are selected for statistics, and the pictures having blobs are marked. Different parameters are selected for treatment, and the treated result is analyzed, as shown in the following table:

TABLE 1

| Solving feature value of k | | | |
|---|---|---|---|
| | The number of blobs actually existing | The number of blobs not actually existing | In total |
| Number of blobs determined as the blobs by taking k as the feature value | rk | dk − rk | dk |
| Number of blobs determined as not the blobs by taking k as the feature value | Nr − rk | Nd − Nr − (dr − rk) | Nd − dr |
| In total | Nr | Nd − Nr | Nd |

When k is taken as the feature value, the ratio of blobs determined as the blobs to the actual blobs is as follows:

$$pk = \frac{rk}{Nr}, \qquad \text{Equation 11}$$

When k is taken as the feature value, the ratio of blobs which are determined as the blobs but are not actually blobs to the actual blobs is as follows:

$$uk = \frac{dr - rk}{Nd - Nr}, \qquad \text{Equation 12}$$

Herein the weight coefficient when the feature value is k needs to be solved, which can be defined as follows:

$$wk = \frac{pk/(1-pk)}{uk/(1-uk)}, \qquad \text{Equation 13}$$

The above Equation is important to render that when the feature value is k, the possibility of a correct determination of blobs can be as high as possible, and the lower the possibility of determination of blobs which are not actual blobs, the greater the weight wk. And each parameter with a maximum wk is selected as the parameter to be determined for feature point detection of the SimpleBlobDetector algorithm. As a result, it's not necessary to determine the specific value of this parameter manually.

The blobs are detected by manual observation conventionally, but according to the method of this embodiment, the pretreated image is automatically detected by a robot to find whether there are blobs by the above means.

Figure 13:
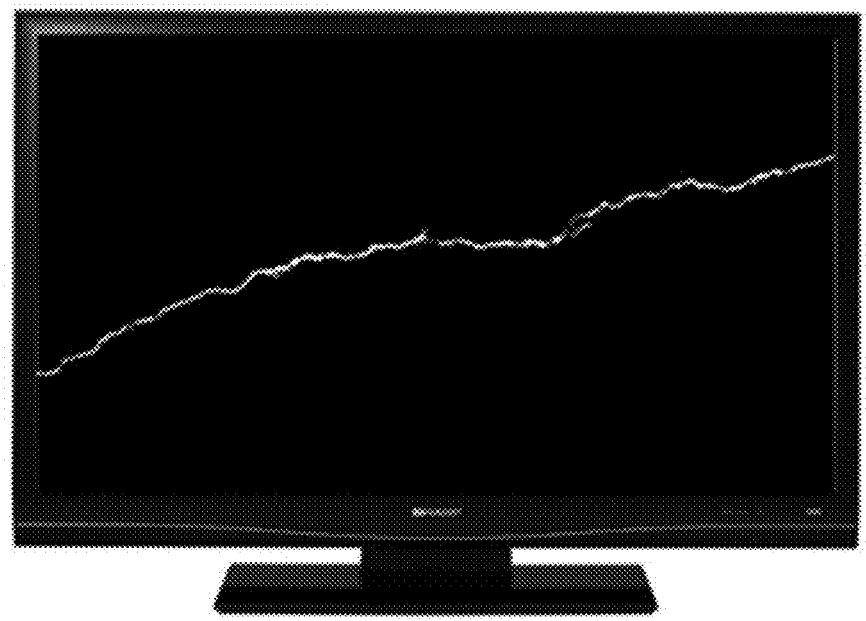
FIG. 13 is a schematic view showing a state where cracks appear on the display screen.

Crack detection analysis is carried out on the enhanced image to determine whether cracks occur on a display screen of the service device to be detected. With reference to FIG. 13, a case where cracks occur on the screen is shown.

Figure 14:
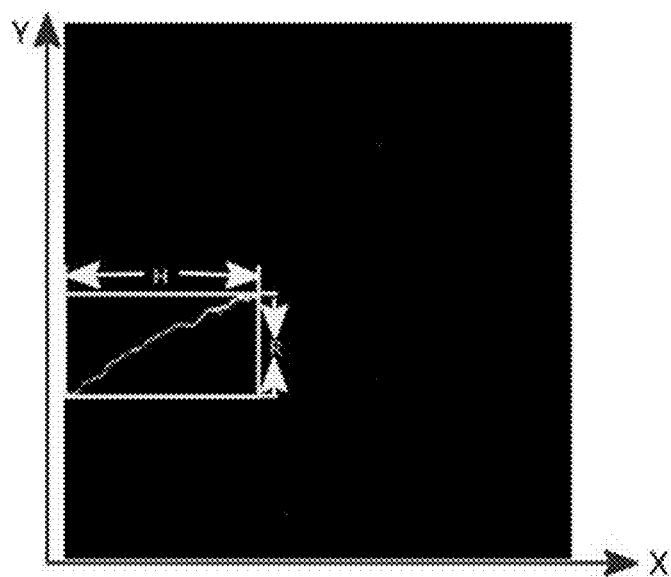
FIG. 14 is a schematic view showing a transverse cracks on the display screen.

In one embodiment, whether cracks occur on the screen or not is detected through the following steps:

image segmentation is carried out with cracks being segmented therefrom with a mean shift algorithm, a proven prior art, as shown in FIG. 14; after this, cracks on the segmented image are identified: a plurality of connected areas can be seen after segmentation, wherein the connected areas refer to image areas formed by segmenting cracks from the image, and if the number of the connected areas is detected to be more than 1, it can be determined that there are cracks on the image, and the cracks can be netted cracks or a single crack crossing the screen. If there is only one connected area, the X-axis projection distance H of the crack and the y-axis projection distance R are obtained respectively, as shown in FIG. 14. If H is smaller than a threshold value D and R is smaller than the threshold value D, the screen has no crack. The threshold value D is a distance value, and when H and R are both smaller than this value, instead of a crack, a noise point is identified. If either H or R is greater than this threshold value, it can be determined that there is a transverse or vertical crack on the screen which does not span the entire screen yet, the one shown in FIG. 14 is a form of a transverse crack.

The cracks are detected by manual observation conventionally, but according to the method of this embodiment, the pretreated image is automatically detected by a robot to find whether there are cracks by the above means.

In the embodiment, the technical solution includes: controlling the robot to move into a preset area of each of service devices in a self-service branch respectively; taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if there is no circuit fault, and analyzing the image displayed on the display screen according to preset analysis rules to find whether the display screen of the service device to be detected has an abnormality of a preset type. The solution requires no manual participation, and the circuit fault and the screen display state of the device are automatically detected by moving the robot into a corresponding area.

Alternatively, in another embodiment, the automatic screen state detection program may be divided into one or more modules that are stored in the memory 11 and executed by one or more processors (processor 12 in this embodiment) to implement the present application. The modules in this application refer to a series of computer program instruction segments capable of performing particular functions.

Figure 15:
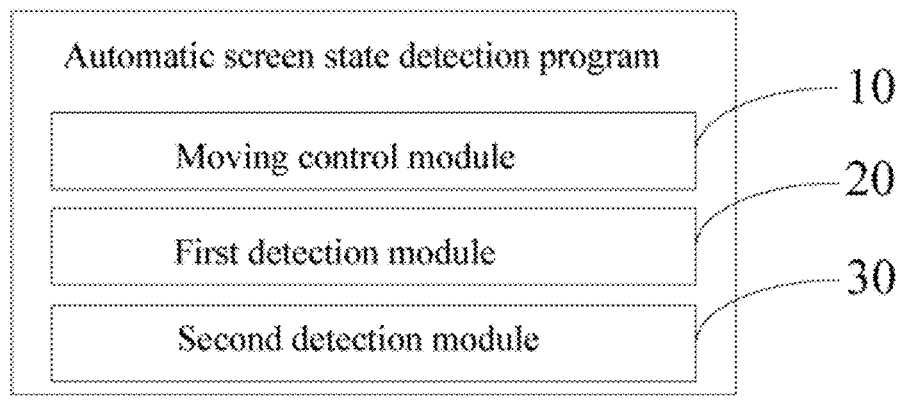
FIG. 15 is a schematic view of program modules of an automatic screen state detection program in an embodiment of the automatic screen state detection robot of the present application.

With reference to FIG. 15, shown is a schematic view of a program module of an automatic screen state detection program in an embodiment of the automatic screen state detection robot of the present application, in which the automatic screen state detection program can be divided into a moving control module 10, a first detection module 20 and a second detection module 30. The modules 10-30 are executed to carry out functions or operation steps substantially the same as the above embodiments and will not be described in detail herein. As an example, the moving control module 10 is used for controlling the robot to move into a preset area of each of service devices of a self-service branch respectively;

the first detection module 20 is used for taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and the second detection module 30 is used for controlling the service device to be detected to display an image according to preset display parameters if the display screen has no circuit fault, and analyzing the image displayed on the display screen to find whether the display screen of the service device to be detected has an abnormality of a preset type.

Figure 16:
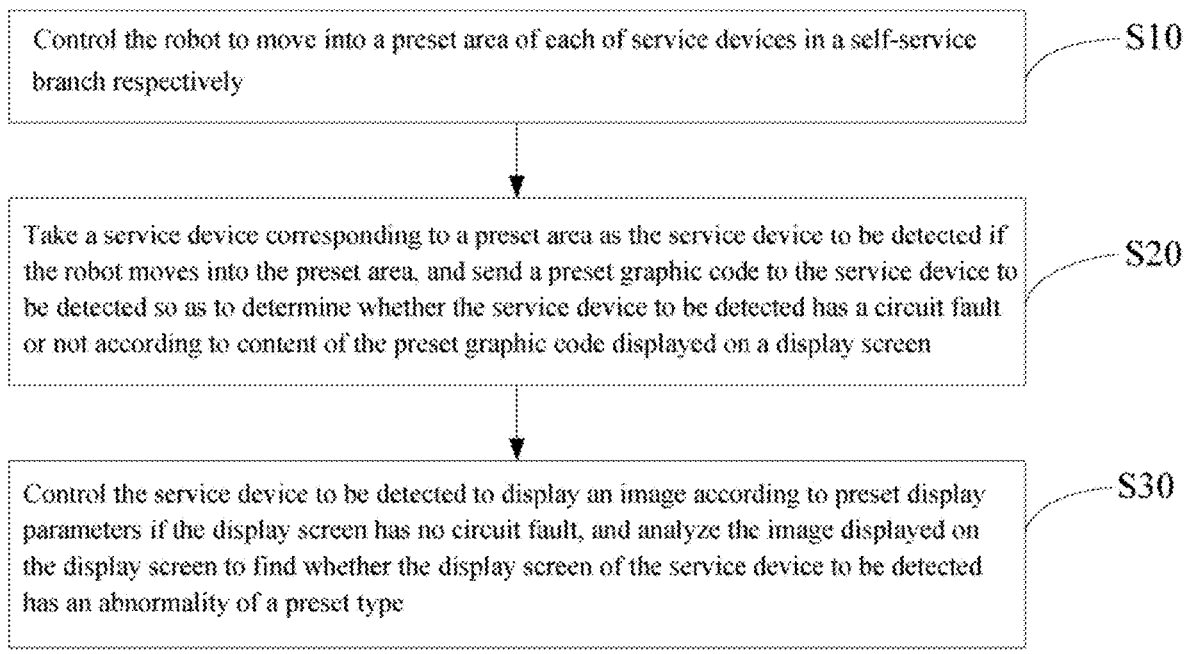
FIG. 16 is a flowchart of a preferred embodiment of the automatic screen state detection method of the present application.

In addition, the application also provides an automatic screen state detection method. With reference FIG. 16, a flowchart of a preferred embodiment of the automatic screen state detection method of the present application is shown. The method may be performed by a device and the robot may be implemented by software and/or hardware.

In the embodiment, the automatic screen state detection method includes the following steps:

S10, the robot is controlled to move into a preset area of each of service devices in a self-service branch respectively.

The robot in the embodiment can be deployed in a self-service branch, and there can be one or more service devices in the self-service branch. The robot can be controlled to move to a self-service branch at any time or regularly and when the robot is standby or receives a detection instruction, to start the detection of the display state of a screen of a service device in the self-service branch. The robot is determined to be standby when no service of the robot has been called for a preset duration.

Each of the service devices in the self-service branch is assigned with a preset area, the preset area of one service device refers to an area around the service machine having a radius equal to or less than a preset distance. The position coordinate of the robot in the self-service branch is determined by positioning itself in its moving process and is combined with the known position coordinate of the service device in the self-service branch to calculate distances between the current position and the preset positions where service devices are located, and if the a between the current position and the position where one service device is located is less than or equal to the preset distance, it's determined that the robot has moved into the preset area of the service device.

When a plurality of service devices are deployed in a self-service branch, they need to be detected one by one. There are a variety of ways to control the robot to move into the predetermined area of each of the service devices in the self-service branch respectively, two of which are given below as examples.

In one embodiment, the robot is controlled to move by following a preset mobile navigation path, and after the robot moves into the preset area of one service device and detection of the display screen of the service device to be detected is completed, the robot is controlled to continue moving by following the mobile navigation path to another undetected service device until detection of the display screens of all the service devices is completed.

Alternatively, in another embodiment, the robot is controlled to move randomly, and after the robot moves into the preset area of one service device and detection of the display screen of the service device to be detected is completed, the service device to be detected is labeled as an obstacle and the robot is controlled to circumvent; after the circumvention is completed, the robot is controlled to continue moving randomly to another service device until all the service devices are labeled as the obstacles; and the obstacle labels of the service devices are removed.

In particular, in the random moving process of the robot, the mechanism of the circumvention algorithm is as follows: when detection of a service device is completed by the robot, the robot shifts leftwards or rightwards relative to the current moving direction by a preset angle and determines whether it can circumvent successfully or not after shifting by the angle. If the robot can circumvent successfully after shifting by the angle, it continues to move randomly along the shifted direction, and if the robot is obstructed still after shifting by the angle, it continues to shift relative to the same direction by the preset angle until it circumvents successfully; the circumvention is conducted through the algorithm of continuously adjusting the shift angle.

S20, a service device corresponding to a preset area is taken as the service device to be detected if the robot moves into the preset area, and a preset graphic code is sent to the service device to be detected so as to determine whether the service device to be detected has a circuit fault or not according to content of the preset graphic code displayed on a display screen.

When the robot enters a preset area, the service device corresponding to the preset area is taken as the service device to be detected, and the service device corresponding to the preset area is detected. The robot can adjust the angle of the camera 15 until a currently displayed image on the display screen of the service device can be photographed, and then the preset graphic code is sent to the service device to be detected so as to determine whether the service device to be detected has a circuit fault or not according to the content of the preset graphic code displayed on the display screen. In particular, the robot is controlled to communicate wirelessly with the service device to be detected (i.e., the service device corresponding to the current preset area) so as to send a display instruction for displaying the preset graphic code containing preset information to the service device to be detected, and the preset graphic code is displayed by the service device according to the received display instruction; the robot is controlled to scan and analyze the content displayed on the display screen of the service device to be detected; if the preset information is scanned and analyzed from the display screen of the service device to be detected, it is determined that the display screen of the service device to be detected has no circuit fault; and if the preset information is not scanned and analyzed from the display screen of the service device to be detected, it is determined that the display screen of the service device to be detected has the circuit fault.

In some embodiments, the preset graphic code may be a two-dimensional code with preset information. Detection of circuit faults by using two-dimensional codes has the following advantages: the two-dimensional code has good fault tolerance and error correction capability, and as shown in FIGS. 2a to 2d, the two-dimensional code can still be identified even if part of the information is blocked due to interference such as stains, blobs, cracks and the like on the display screen, so that the determination of whether a circuit fault occurs or not may not be influenced regardless all of those; the two-dimensional code can contain information such as the ID of the screen, that is to say, even when the robot is simultaneously confronted with the display screens of a plurality of service devices, the service device corresponding to the preset area can be identified according to the screen ID contained in the two-dimensional codes. Since the outer contour of the two-dimensional code is square, identification can be done without requiring the robot to be right in front of the target screen, even in a perspective view, the robot can easily restore the deformation caused by the perspective view, as shown in FIGS. 3a to 3c.

As can be seen from FIGS. 3a and 3b, when the robot processes the content displayed on the screen with the camera, the outer contour of the two-dimensional code may be non-rectangular in the lens of the robot due to the perspective view caused by the position of the robot to some extent. It can be seen from FIG. 3b that the two-dimensional code is not shown as a square, but a quadrilateral shape, resulting in "foreshortening effects". However, the robot can perform inverse perspective transformation under the perspective view so that the two-dimensional code can be identified normally, and the inverse perspective transformation method, which is a proven prior art, is not explained in detail herein. With reference to FIG. 3c, shown is the effect of the two-dimensional code after inverse perspective transformation.

Further, in some embodiments, prompt message is sent to a predetermined monitoring device to indicate that the display screen has the circuit fault to be dealt with if the service device to be detected has the circuit fault. For example, a prompt message including a unique identification (ID) of the service device having the circuit fault and a branch identification of the self-service branch where the service device to be detected is located is sent to a background server, and for example, the prompt message format can be "the display screen of the service device with the ID number ** in the self-service branch with the branch identification number *** has the circuit fault to be dealt with".

S30, the service device to be detected is controlled to display an image according to preset display parameters if the display screen has no circuit fault, and the image displayed on the display screen is analyzed to find whether the display screen of the service device to be detected has an abnormality of a preset type.

With reference to FIG. 17, shown is the detailed schematic view of step S30 in the preferred embodiment of the automatic screen state detection method of the present application, including specifically the following steps:

S301, the display screen of the service device to be detected is controlled to display a plurality of preset colors, for example, three preset colors red, green and blue, in a single-color display mode respectively, wherein different preset colors correspond to display areas of different sizes, a shape of the display area corresponding to each preset color corresponds to a shape of a maximum display area of the display screen, and a display area corresponding to one of the preset colors is the maximum display area of the display screen;

S302, a mask code for a display graph on the display screen corresponding to a preset color is taken when the preset color is displayed in the single-color display mode, namely other colors except the preset color of the display screen are blocked, so as to obtain a mask code image;

S303, anti-interference treatment is carried out on a mask code image of a preset color corresponding to a display area of a smaller size to obtain an anti-interference image, wherein the display area of the smaller size is a display area of a size other than the maximum display area;

S304, the maximum display area of the display screen is determined according to the obtained anti-interference image, an image of an actual display area for the mask code image of the preset color corresponding to the maximum display area is extracted according to the determined maximum display area, so as to obtain a maximum display image; because if an interference area exists in the peripheral range of the screen, for example, "inflow of water" occurs around the screen, the screen cannot normally display at its boundary area, then the maximum image obtained after obtaining the mask code is still incomplete; this step in essence excludes the boundary interference from detection, and therefore the maximum display area should be obtained in the above-mentioned manner.

With reference to FIG. 4, as an example, three different sized display areas are provided on the display screen, wherein width of the small-sized rectangle screen is L1, width of the medium-sized rectangle screen is L2, and width of the large-sized rectangle screen is L3. When the robot controls the screen display, the proportional relation of L1, L2 and L3 can be set as: $L3=\theta_1 L2=\theta_2 L1$, i.e., $\theta_1$ and $\theta_2$ are known. In addition, the proportional relation $\zeta$ between the length and width of the screen is also known. After the value of L1 or L2 is obtained according to the displayed content, the width L3 of the display screen can be calculated according to the proportional relation of L1, L2 and L3, and then the length W of the display screen can be calculated according to the length-width proportional relation $L/W=\zeta$.

In particular, the mechanism of the step of determining the maximum display area of the display screen according to the obtained anti-interference image of the preset color corresponding to the display area of the smaller size, extracting an image of an actual display area for the mask code image of the preset color corresponding to the maximum display area according to the determined maximum display area, so as to obtain a maximum display image is as follows:

The width of the large-sized rectangular can be calculated on the basis of the width $L_1$ of the small-sized rectangular area according to $L3=\theta_1 L2=\theta_2 L1$, and is represented by $L'_3$.

Likewise, the width of the large-sized rectangular can also be calculated on the basis of the width $L_2$ of the medium-sized rectangle, and is represented by $L'_3$. In order to reduce errors, in the present application, it is preferable to take the average of these two values as the width of the large-sized rectangle according to Equation 1:

$$L_3 = \frac{L'_3 + L''_3}{2}, \quad \text{Equation 1}$$

And then the length W of the large-sized rectangle is calculated according to the length-width proportional relation L/W=ζ. Thus, it is possible to obtain the area of the large-sized rectangle, which is the maximum display area of the screen, that is, the outer contour curve of the maximum-sized rectangular area as shown in FIG. 6.

However, after the mask code images of different colors are taken respectively, since the screen boundary itself may be interfered by other colors, for example, the screen boundary itself may have blobs, and the images for which mask codes are taken according to different colors may not be complete yet. To address this problem, the application adopts a solution of:

obtaining coordinates of a plurality of points on each of boundary lines of the mask code image of the preset color corresponding to the display area of the smaller size;

obtaining an extension line of each of the boundary lines of the mask code image through a least-square straight-line fitting algorithm on the basis of the coordinates of the plurality of points on each of the boundary lines;

obtaining intersection points of the four boundary lines according to the extension line of each of the boundary lines of the mask code image, and determining a position of a quadrilateral of the mask code image according to the intersection points of the four boundary lines and the four boundary lines, namely, the scope framed by the small-sized or medium-sized rectangles; and transforming the quadrilateral into a rectangle through inverse perspective transformation, and obtaining the anti-interference image according to a position of the mask code image rectangle.

With reference to FIG. 5, a boundary of the calculated small-sized rectangle and a boundary of the medium-sized rectangle are shown respectively. With reference to FIG. 7, several points are taken from the boundary, and the boundary is simulated through a least-square straight-line fitting algorithm, as shown in FIG. 8. The least-square straight-line fitting algorithm is presented as $y_{calculation}=a0+a1*x$, wherein $y_{calculation}$ is the simulated straight line, $a_0$ and $a_1$ are parameters to be solved. After $a_0$ and $a_1$ are obtained through the algorithm, the extension line of the boundary line can be obtained, and extension lines of the four boundary lines are respectively obtained the same, after this the intersection points of the four boundary lines are determined, the position of the quadrilateral of the mask code image is determined according to the intersection points of the four boundary lines and the four boundary lines, namely, the scope framed by the small-sized or medium-sized rectangles, and then accurate values of L1 and L2 are determined.

S305, noise-filtering enhancement pretreatment is carried out on the maximum display image to obtain an enhanced image.

The mechanism of carrying out noise-filtering enhancement pretreatment on the maximum display image to obtain an enhanced image is explained as follows:

the collected abnormal image of the screen can be influenced by non-uniform illumination, irregular gaps on the surface of the screen, factors of the device and the like, as a result, the collected images have noise which needs to be eliminated, and meanwhile, it's required to keep the details of the abnormal state of the screen and improve the contrast of cracks against the background as much as possible to facilitate subsequent segmentation and identification. As can be seen from the graph before the pretreatment of FIG. 9 and the graph after the pretreatment of FIG. 10, the noise interference is less in the graph with enhanced noise filtering, and the abnormality is more clearly visible.

The image is pretreated by the method of guided filter. The algorithm steps of using the guided filter are as follows:

a grayed screen image is used as an input image P, a grayed screen image is also used as a guide image I, an image filtered by using a noise filter is q, and the input image P is enhanced by using Equation 2.

$$P\_enhanced = (I-q)m+q \quad \text{Equation 2}$$

Wherein m is an enhancement coefficient which depends on specific circumstance, and the filter can be selected according to specific circumstance, herein a guided filter is selected to filter the image P.

The parameter m here can be re-adjusted through feedback according to P_enhanced effect (enhanced image P). An iterative solution is conceived herein, which is mainly implemented by providing feedback concerning the P_enhanced effect and giving a higher weight to the more satisfying P_enhanced effect, otherwise a lower weight to the less satisfying P_enhanced effect.

In the following equation, ε is a ratio of satisfaction, the enhanced satisfaction is evaluated according to the effect of the P_enhanced image, and the highest enhanced satisfaction is set to be a fixed value, for example, 500.

$$\varepsilon = \frac{\text{enhanced satisfaction}}{\text{highest enhanced satisfaction}}, \quad \text{Equation 3}$$

According to the application, in order to better adjust the satisfaction value, ε value is subjected to an alpha operation defined as follows:

$$\alpha = \frac{1}{2}\ln\left(\frac{1-\varepsilon}{\varepsilon}\right), \quad \text{Equation 4}$$

The $n^{th}$ iteration is represented by $T_n$, the $(n+1)^{th}$ iteration is represented by $T_{n+1}$, and after the $n^{th}$ iteration, the value of m is $m_{T_n}$, and then:

$$m_{T_n} = m_{T_{n-1}} e^{-\alpha}, \quad \text{Equation 5}$$

The iterative process is as follows: first, an initial weight value m is given as $m_{T_1}$, which is then substituted into Equation 2 to calculate the P_enhanced image, the satisfaction on the effect of the P_enhanced image is evaluated according to Equation 3, the satisfaction ratio ε obtained is subjected to the alpha operation, and then the m weight value is updated by using the alpha operation result and Equation 5. The steps above are repeatedly carried out in sequence to update m, and an optimal weight value m is obtained after several iterations. Because the weight value m is modified after each iteration, the c value is reduced when the image P_enhanced effect is poor, so that the final weight value m is reduced, and otherwise, the weight value is increased accordingly. Each adjustment will bring a better image P_enhanced effect, the number of iterations is set to be a fixed value (herein set to be 10), and after n iterations, a convergence will occur, where, namely, the image P_enhanced effect is approaching the optimum state. And the enhanced image P_enhanced is taken as an input image P and the grayed screen image is taken as a guide image I to obtain a filtered image which is a final enhanced and smoothed image.

S306, the enhanced image is analyzed to find whether the display screen of the service device to be detected has the abnormality of the preset type which includes blobs, lines and cracks.

Blob detection analysis is carried out on the enhanced image to determine whether the display screen of the service device to be detected has blobs.

With reference to FIG. 11, a case where lines appear on the screen is shown.

In one embodiment, the process of identifying the lines is as follows: an image pretreated by the above steps is obtained, a straight line is detected by using Hough Transform, lines are determined to exist when the number of the detected lines is more than 1, and otherwise, no line exists.

Hough Transform is a feature extraction technique. Classical Hough Transform can identify straight lines in an image, and evolves to identify any shapes, but more commonly, to identify circles and ellipses, and herein, Hough Transform is used for identifying the state of the lines on the screen.

In a system of rectangular coordinates, a straight line is defined as:

$$y = mx + b, \quad \text{Equation 6}$$

Wherein, m is the slope and b is the y-intercept, a straight line can be uniquely determined as long as m and b are determined. If an algebraic distance from the origin to the straight line is represented by $\rho_0$, the included angle between the orthogonal line with respect to the straight line and the x-axis is represented by $\theta_0$, then:

$$m = -\frac{1}{\tan \theta_0}, \quad \text{Equation 7}$$

$$b = \frac{\rho_0}{\sin \theta_0}, \quad \text{Equation 8}$$

Then the straight line can also be represented as:

$$y = \left(-\frac{\cos \theta_0}{\sin \theta_0}\right)x + \left(\frac{\rho_0}{\sin \theta_0}\right), \quad \text{Equation 9}$$

The above equation can be written in a more general form as:

$$\rho = x \cos \theta + y \sin \theta, \quad \text{Equation 10}$$

It will be readily appreciated that $(\rho, \theta)$ represents the polar coordinates. But if $(\rho, \theta)$ is also represented in the form of rectangular coordinates, i.e., $\rho$ and $\theta$ are subjected to an orthogonal treatment, then $(\rho, \theta)$ is called Hough space.

A point in the system of rectangular coordinates corresponds to a sinusoid in the Hough space. A straight line is composed of countless points, and corresponds to countless sinusoids in the Hough space, but the sinusoids intersect at a point $(\rho_0, \theta_0)$, which is substituted into Equations 7 and 8 to solve the slope and intercept of the straight line, so that a straight line is determined. Therefore, when a line is identified using Hough Transform, a local maximum value in Hough space may correspond to a straight line.

The lines are detected by manual observation conventionally, but according to the method of this embodiment, the pretreated image is automatically detected by a robot to find whether there are lines by the above means.

Line detection analysis is carried out on the enhanced image to determine whether the display screen of the service device to be detected has lines. With reference to FIG. 12, a case where blobs appear on the screen is shown.

In one embodiment, the process of identifying the blobs is as follows: a pretreated picture is obtained for detection of blobs by using a SimpleBlobDetector (blob detection operator) algorithm, it is determined that there are blobs on the screen when the number of the detected blobs is more than 1, and otherwise it is determined that no blob exists.

In addition, in order to simplify the setting of parameters such as an area, a binarization threshold value and the like for identifying blobs, a method is also introduced for selecting parameters used in the SimpleBlobDetector algorithm in the embodiment.

Some pictures with blobs on the screen are selected for statistics, and the pictures having blobs are marked. Different parameters are selected for treatment, and the treated result is analyzed, as shown in Table 1 above.

When k is taken as the feature value, the ratio of blobs determined as the blobs to the actual blobs is as follows:

$$pk = \frac{rk}{Nr}, \quad \text{Equation 11}$$

When k is taken as the feature value, the ratio of blobs which are determined as the blobs but are not actually blobs to the actual blobs is as follows:

$$uk = \frac{dr - rk}{Nd - Nr}, \quad \text{Equation 12}$$

Herein the weight coefficient when the feature value is k needs to be solved, which can be defined as follows:

$$wk = \frac{pk/(1 - pk)}{uk/(1 - uk)}, \quad \text{Equation 13}$$

The above Equation is important to render that when the feature value is k, the possibility of a correct determination of blobs can be as high as possible, and the lower the possibility of determination of blobs which are not actual blobs, the greater the weight wk. And each parameter with a maximum wk is selected as the parameter to be determined for feature point detection of the SimpleBlobDetector algorithm. As a result, it's not necessary to determine the specific value of this parameter manually.

The blobs are detected by manual observation conventionally, but according to the method of this embodiment, the pretreated image is automatically detected by a robot to find whether there are blobs by the above means.

Crack detection analysis is carried out on the enhanced image to determine whether cracks occur on a display screen of the service device to be detected. With reference to FIG. 13, a case where cracks occur on the screen is shown.

In one embodiment, whether cracks occur on the screen or not is detected through the following steps:

image segmentation is carried out with cracks being segmented therefrom with a mean shift algorithm, a proven prior art, as shown in FIG. 14; after this, cracks on the segmented image are identified: a plurality of connected areas can be seen after segmentation, wherein the connected areas refer to image areas formed by segmenting cracks from the image, and if the number of the connected areas is detected to be more than 1, it can be determined that there are cracks on the image, and the cracks can be netted cracks or a single crack crossing the screen. If there is only one connected area, the X-axis projection distance H of the crack and the Y-axis projection distance R are obtained respectively, as shown in FIG. 14. If H is smaller than a threshold value D and R is smaller than the threshold value D, the screen has no crack. The threshold value D is a distance value, and when H and R are both smaller than this value, instead of a crack, a noise point is identified. If either H or R is greater than this threshold value, it can be determined that there is a transverse or vertical crack on the screen which does not span the entire screen yet, the one shown in FIG. 14 is a form of a transverse crack.

The cracks are detected by manual observation conventionally, but according to the method of this embodiment, the pretreated image is automatically detected by a robot to find whether there are cracks by the above means.

In the automatic screen state detection method provided by this embodiment, the technical solution includes: controlling the robot to move into a preset area of each of service devices in a self-service branch respectively; taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if there is no circuit fault, and analyzing the image displayed on the display screen according to preset analysis rules to find whether the display screen of the service device to be detected has an abnormality of a preset type. The solution requires no manual participation, and the circuit fault and the screen display state of the device are automatically detected by moving the robot into a corresponding area.

In addition, the embodiment of the application also provides a computer-readable storage medium having an automatic screen state detection program stored thereon, and the automatic screen state detection program can be executed by one or more processors to implement the operations of:

controlling the robot to move into a preset area of each of service devices in a self-service branch respectively;

taking a service device corresponding to a preset area as the service device to be detected if the robot moves into the preset area, and sending a preset graphic code to the service device to be detected so as to determine whether the service device to be detected has a circuit fault or not according to content of the preset graphic code displayed on a display screen; and controlling the service device to be detected to display an image according to preset display parameters if the display screen has no circuit fault, and analyzing the image displayed on the display screen to find whether the display screen of the service device to be detected has an abnormality of a preset type.

Furthermore, the automatic screen state detection program is executed by the processor to implement the following operation of:

sending prompt message to a predetermined monitoring device to indicate that the display screen has the circuit fault to be dealt with if the service device to be detected has the circuit fault.

Furthermore, the automatic screen state detection program is executed by the processor to implement the following operation of:

controlling the robot to move by following a preset mobile navigation path, and after the robot moves into the preset area of one service device and detection of the display screen of the service device to be detected is completed, controlling the robot to continue moving by following the mobile navigation path until detection of the display screens of all the service devices is completed; or controlling the robot to move randomly, and after the robot moves into the preset area of one service device and detection of the display screen of the service device to be detected is completed, labeling the service device to be detected as an obstacle and controlling the robot to circumvent; after the circumvention is completed, controlling the robot to continue moving randomly until all the service devices are labeled as the obstacles; and removing the obstacle labels of the service devices.

Furthermore, the automatic screen state detection program is executed by the processor to implement the following operations of:

controlling the robot to communicate wirelessly with the service device to be detected so as to send a display instruction for displaying the preset graphic code to the service device to be detected, wherein the preset graphic code comprises preset information; controlling the robot to scan and analyze the content displayed on the display screen by the service device to be detected on the basis of the display instruction; determining that the display screen of the service device to be detected has no circuit fault if the preset information is scanned and analyzed from the display screen of the service device to be detected; and determining that the display screen of the service device to be detected has the circuit fault if the preset information is not scanned and analyzed from the display screen of the service device to be detected.

Furthermore, the automatic screen state detection program is executed by the processor to implement the following operations of:

controlling the display screen of the service device to be detected to display a plurality of preset colors in a single-color display mode respectively, wherein different preset colors correspond to display areas of different sizes, a shape of the display area corresponding to each preset color corresponds to a shape of a maximum display area of the display screen, and a display area corresponding to one of the preset colors is the maximum display area of the display screen; taking a mask code for a display graph on the display screen corresponding to a preset color when the preset color is displayed in the single-color display mode, so as to obtain a mask code image; carrying out anti-interference treatment on a mask code image of a preset color corresponding to a display area of a smaller size to obtain an anti-interference image, wherein the display area of the smaller size is a display area of a size other than the maximum display area; determining the maximum display area of the display screen according to the obtained anti-interference image, extracting an image of an actual display area for the mask code image of the preset color corresponding to the maximum display area according to the determined maximum display area, so as to obtain a maximum display image; carrying out noise-filtering enhancement pretreatment on the maximum display image to obtain an enhanced image; and analyzing the enhanced image to find whether the display screen of the service device to be detected has the abnormality of the preset type.

Furthermore, the automatic screen state detection program is executed by the processor to implement the following operations of:

obtaining coordinates of a plurality of points on each of boundary lines of the mask code image of the preset color corresponding to the display area of the smaller size; obtaining an extension line of each of the boundary lines of the mask code image through a least-square straight-line fitting algorithm on the basis of the coordinates of the plurality of points on each of the boundary lines; obtaining intersection points of the four boundary lines according to the extension line of each of the boundary lines of the mask code image, and determining a position of a quadrilateral of the mask code image according to the intersection points of the four boundary lines and the four boundary lines; and transforming the quadrilateral into a rectangle through inverse perspective transformation, and obtaining the anti-interference image according to a position of the mask code image rectangle.

Embodiments of the computer-readable storage medium of the present application are substantially the same as the embodiments of the above-described automatic screen state detection robot and method, which will not be described herein.

It should be noted that the above-mentioned embodiments of the present application are by way of illustration only and do not represent advantages or disadvantages of the embodiments. Also, the terms "include", "comprise", or any other variation thereof, are intended to cover a non-exclusive inclusion, such that a process, device, article, or method that includes a series of elements does not include only those elements but may include other elements not exactly listed or inherent to such process, device, article, or method. An element defined by the phrase "include(s) . . . " does not, without more constraints, preclude the existence of additional identical elements in the process, device, article, or method that includes the element.

From the above description of the embodiments, it will be clear to a person skilled in the art that the methods in the embodiments can be implemented by means of software together with the necessary general-purpose hardware platform, but in many cases the former is a more preferable embodiment. Understood like that, the technical solution of the present application, in essence or in part contributing to the prior art, may be embodied in the form of a software product stored in a storage medium (e.g., ROM/RAM, diskette, optical disk) as described above, including instructions for causing a terminal device (which may be a cell phone, computer, server, network device, etc.) to carry out the methods described in the various embodiments of the present application.

The foregoing is merely a preferred embodiment of the present application and is not intended to limit the scope of the present application, for example, the equivalent structures or equivalent processes shown in the description and drawings may be utilized directly or indirectly in other related technical fields, and all equivalents are intended to be included within the scope of the present application.

What is claimed is:

1. An automatic screen state detection robot, comprising a memory having an automatic screen state detection program stored thereon and a processor, and the automatic screen state detection program being executed by the processor to implement the operations of:

controlling the robot to move into a preset area of each of service devices in a self-service branch respectively;

taking a service device corresponding to a preset area as the service device to be detected if the robot moves into the preset area, and sending a preset graphic code to the service device to be detected so as to determine whether a display screen of the service device to be detected has a circuit fault or not according to content of the preset graphic code displayed on the display screen; and controlling the service device to display an image according to preset display parameters if the display screen has no circuit fault and analyzing the image displayed on the display screen to find whether the display screen has an abnormality of a preset type, comprising:

controlling the display screen to display a plurality of preset colors in a single-color display mode simultaneously, wherein different preset colors correspond to display areas of different sizes, a shape of the display area corresponding to each preset color corresponds to a shape of a maximum display area of the display screen, and a display area corresponding to one of the preset colors is the maximum display area of the display screen;

taking a mask code for a display graph on the display screen corresponding to a preset color when the preset color is displayed in the single-color display mode, so as to obtain a mask code image;

carrying out anti-interference treatment on a mask code image of a preset color corresponding to a display area that is smaller than the maximum display area to obtain an anti-interference image;

determining an actual maximum display area of the display screen according to theobtained anti-interference image, extracting an image of an actual display area for the mask code image of the preset color corresponding to the maximum display area according to the determined actual maximum display area, so as to obtain a maximum display image;

carrying out noise-filtering enhancement pretreatment on the maximum display image to obtain an enhanced image; and analyzing the enhanced image to find whether the display screen to be detected has the abnormality of the preset type.

2. The automatic screen state detection robot according to claim 1, wherein the processor is further configured for executing the automatic screen state detection program to implement, after the preset graphic code being sent to the service device to be detected so as to determine whether the service device to be detected has the circuit fault or not according to the content of the preset graphic code displayed on the display screen, the step of:

sending prompt message to a predetermined monitoring device to indicate that the display screen has the circuit fault to be dealt with if the service device to be detected has the circuit fault.

3. The automatic screen state detection robot according to claim 1, wherein the operation of controlling the robot to move into a preset area of each of service devices in a self-service branch respectively comprises:

controlling the robot to move by following a preset mobile navigation path, and after the robot moves into the preset area of one service device and detection of the display screen to be detected is completed, controlling the robot to continue moving by following the mobile navigation path until detection of display screens of all the service devices is completed; or controlling the robot to move randomly, and after the robot moves into the preset area of one service device and detection of the display screen to be detected is completed, labeling the service device to be detected as an obstacle and controlling the robot to circumvent; after the circumvention is completed, controlling the robot to continue moving randomly until all the service devices are labeled as the obstacles; and removing the obstacle labels of the service devices.

4. The automatic screen state detection robot according to claim 1, wherein the operation of sending a preset graphic code to the service device to be detected so as to determine whether a display screen of the service device to be detected has a circuit fault or not according to content of the preset graphic code displayed on the display screen comprises:

controlling the robot to communicate wirelessly with the service device to be detected so as to send a display instruction for displaying the preset graphic code to the service device to be detected, wherein the preset graphic code comprises preset information;

controlling the robot to scan and analyze the content displayed on the display screen by the service device to be detected on the basis of the display instruction;

determining that the display screen to be detected has no circuit fault if the preset information is scanned and analyzed from the display screen to be detected; and determining that the display screen to be detected has the circuit fault if the preset information is not scanned and analyzed from the display screen to be detected.

5. The automatic screen state detection robot according to claim 1, wherein the step of carrying out anti-interference treatment on a mask code image of a preset color corresponding to a display area that is smaller than the maximum display area to obtain an anti-interference image comprises:

obtaining coordinates of a plurality of points on each of boundary lines of the mask code image of the preset color corresponding to the display area that is smaller than the maximum display area;

obtaining an extension line of each of the boundary lines of the mask code image through a least-square straight-line fitting algorithm on the basis of the coordinates of the plurality of points on each of the boundary lines;

obtaining intersection points of the four boundary lines according to the extension line of each of the boundary lines of the mask code image, and determining a position of a quadrilateral of the mask code image according to the intersection points of the four boundary lines and the four boundary lines; and transforming the quadrilateral into a rectangle through inverse perspective transformation, and obtaining the anti-interference image according to a position of the mask code image rectangle.

6. An automatic screen state detection robot, comprising:

controlling the robot to move into a preset area of each of service devices in a self-service branch respectively;

taking a service device corresponding to a preset area as the service device to be detected if the robot moves into the preset area, and sending a preset graphic code to the service device to be detected so as to determine whether a display screen of the service device to be detected has a circuit fault or not according to content of the preset graphic code displayed on the display screen; and controlling the service device to be detected to display an image according to preset display parameters if the display screen has no circuit fault and analyzing the image displayed on the display screen to find whether the display screen has an abnormality of a preset type, comprising:

controlling the display screen to display a plurality of preset colors in a single-color display mode simultaneously, wherein different preset colors correspond to display areas of different sizes, a shape of the display area corresponding to each preset color corresponds to a shape of a maximum display area of the display screen, and a display area corresponding to one of the preset colors is the maximum display area of the display screen;

taking a mask code for a display graph on the display screen corresponding to a preset color when the preset color is displayed in the single-color display mode, so as to obtain a mask code image;

carrying out anti-interference treatment on a mask code image of a preset color corresponding to a display area that is smaller than the maximum display area to obtain an anti-interference image;

determining an actual maximum display area of the display screen according to the obtained anti-interference image, extracting an image of an actual display area for the mask code image of the preset color corresponding to the maximum display area according to the determined actual maximum display area, so as to obtain a maximum display image;

carrying out noise-filtering enhancement pretreatment on the maximum display image to obtain an enhanced image; and analyzing the enhanced image to find whether the display screen to be detected has the abnormality of the preset type.

7. The automatic screen state detection method according to claim 6, further comprising, after the preset graphic code being sent to the service device to be detected so as to determine whether the service device to be detected has the circuit fault or not according to the content of the preset graphic code displayed on the display screen, the step of:

sending prompt message to a predetermined monitoring device to indicate that the display screen has the circuit fault to be dealt with if the service device to be detected has the circuit fault.

8. The automatic screen state detection method according to claim 6, wherein the step of controlling the robot to move into a preset area of each of service devices in a self-service branch respectively comprises:

controlling the robot to move by following a preset mobile navigation path, and after the robot moves into the preset area of one service device and detection of the display screen to be detected is completed, controlling the robot to continue moving by following the mobile navigation path until detection of the display screens of all the service devices is completed; or controlling the robot to move randomly, and after the robot moves into the preset area of one service device and detection of the display screen to be detected is completed, labeling the service device to be detected as an obstacle and controlling the robot to circumvent;

after the circumvention is completed, controlling the robot to continue moving randomly until all the service devices are labeled as the obstacles; and removing the obstacle labels of the service devices.

9. The automatic screen state detection method according to claim 6, wherein the step of sending a preset graphic code to the service device to be detected so as to determine whether a display screen of the service device to be detected has a circuit fault or not according to content of the preset graphic code displayed on the display screen comprises:
controlling the robot to communicate wirelessly with the service device to be detected so as to send a display instruction for displaying the preset graphic code to the service device to be detected, wherein the preset graphic code comprises preset information;
controlling the robot to scan and analyze the content displayed on the display screen by the service device to be detected on the basis of the display instruction;
determining that the display screen to be detected has no circuit fault if the preset information is scanned and analyzed from the display screen of the service device to be detected; and
determining that the display screen of the service device to be detected has the circuit fault if the preset information is not scanned and analyzed from the display screen to be detected.

10. The automatic screen state detection method according to claim 6, wherein the step of carrying out anti-interference treatment on a mask code image of a preset color corresponding to a display area that is smaller than the maximum display area to obtain an anti-interference image comprises:
obtaining coordinates of a plurality of points on each of boundary lines of the mask code image of the preset color corresponding to the display area that is smaller than the maximum display area;
obtaining an extension line of each of the boundary lines of the mask code image through a least-square straight-line fitting algorithm on the basis of the coordinates of the plurality of points on each of the boundary lines;
obtaining intersection points of the four boundary lines according to the extension line of each of the boundary lines of the mask code image, and determining a position of a quadrilateral of the mask code image according to the intersection points of the four boundary lines and the four boundary lines; and
transforming the quadrilateral into a rectangle through inverse perspective transformation, and obtaining the anti-interference image according to a position of the mask code image rectangle.

11. A non-transitory computer-readable storage medium, wherein the computer-readable storage medium has an automatic screen state detection program stored thereon, and the automatic screen state detection program can be executed by one or more processors to implement the steps of:
controlling the robot to move into a preset area of each of service devices in a self-service branch respectively;
taking a service device corresponding to a preset area as the service device to be detected if the robot moves into the preset area, and sending a preset graphic code to the service device to be detected so as to determine whether a display screen of the service device to be detected has a circuit fault or not according to content of the preset graphic code displayed on the display screen; and
controlling the service device to be detected to display an image according to preset display parameters if the display screen has no circuit fault and analyzing the image displayed on the display screen to find whether the display screen has an abnormality of a preset type, comprising:
controlling the display screen to display a plurality of preset colors in a single-color display mode simultaneously, wherein different preset colors correspond to display areas of different sizes, a shape of the display area corresponding to each preset color corresponds to a shape of a maximum display area of the display screen, and a display area corresponding to one of the preset colors is the maximum display area of the display screen;
taking a mask code for a display graph on the display screen corresponding to a preset color when the preset color is displayed in the single-color display mode, so as to obtain a mask code image;
carrying out anti-interference treatment on a mask code image of a preset color corresponding to a display area that is smaller than the maximum display area to obtain an anti-interference image;
determining an actual maximum display area of the display screen according to the obtained anti-interference image, extracting an image of an actual display area for the mask code image of the preset color corresponding to the maximum display area according to the determined actual maximum display area, so as to obtain a maximum display image;
carrying out noise-filtering enhancement pretreatment on the maximum display image to obtain an enhanced image; and
analyzing the enhanced image to find whether the display screen to be detected has the abnormality of the preset type.

12. The non-transitory computer-readable storage medium according to claim 11, wherein the automatic screen state detection program can be further executed by one or more processors to implement, after the preset graphic code being sent to the service device to be detected so as to determine whether the service device to be detected has the circuit fault or not according to the content of the preset graphic code displayed on the display screen, the step of:
sending prompt message to a predetermined monitoring device to indicate that the display screen has the circuit fault to be dealt with if the service device to be detected has the circuit fault.

13. The non-transitory computer-readable storage medium according to claim 11, wherein the step of controlling the robot to move into a preset area of each of service devices in a self-service branch respectively comprises:
controlling the robot to move by following a preset mobile navigation path, and after the robot moves into the preset area of one service device and detection of the display screen to be detected is completed, controlling the robot to continue moving by following the mobile navigation path until detection of display screens of all the service devices is completed; or
controlling the robot to move randomly, and after the robot moves into the preset area of one service device and detection of the display screen to be detected is completed, labeling the service device to be detected as an obstacle and controlling the robot to circumvent; after the circumvention is completed, controlling the robot to continue moving randomly until all the service devices are labeled as the obstacles; and removing the obstacle labels of the service devices.

14. The non-transitory computer-readable storage medium according to claim 11, wherein the step of sending a preset graphic code to the service device to be detected so as to determine whether a display screen of the service device to be detected has a circuit fault or not according to content of the preset graphic code displayed on the display screen comprises:
controlling the robot to communicate wirelessly with the service device to be detected so as to send a display instruction for displaying the preset graphic code to the service device to be detected, wherein the preset graphic code comprises preset information;
controlling the robot to scan and analyze the content displayed on the display screen by the service device to be detected on the basis of the display instruction;
determining that the display screen to be detected has no circuit fault if the preset information is scanned and analyzed from the display screen to be detected; and
determining that the display screen of the service device to be detected has the circuit fault if the preset information is not scanned and analyzed from the display screen to be detected.

15. The non-transitory computer-readable storage medium according to claim 9, wherein the step of carrying out anti-interference treatment on a mask code image of a preset color corresponding to a display area that is smaller than the maximum display area to obtain an anti-interference image comprises:
obtaining coordinates of a plurality of points on each of boundary lines of the mask code image of the preset color corresponding to the display area that is smaller than the maximum display area;
obtaining an extension line of each of the boundary lines of the mask code image through a least-square straight-line fitting algorithm on the basis of the coordinates of the plurality of points on each of the boundary lines;
obtaining intersection points of the four boundary lines according to the extension line of each of the boundary lines of the mask code image, and determining a position of a quadrilateral of the mask code image according to the intersection points of the four boundary lines and the four boundary lines; and
transforming the quadrilateral into a rectangle through inverse perspective transformation, and obtaining the anti-interference image according to a position of the mask code image rectangle.

* * * * *